No. 866,840. PATENTED SEPT. 24, 1907.
J. CLARK.
CLAMPING RING.
APPLICATION FILED DEC. 17, 1906.
2 SHEETS—SHEET 1.
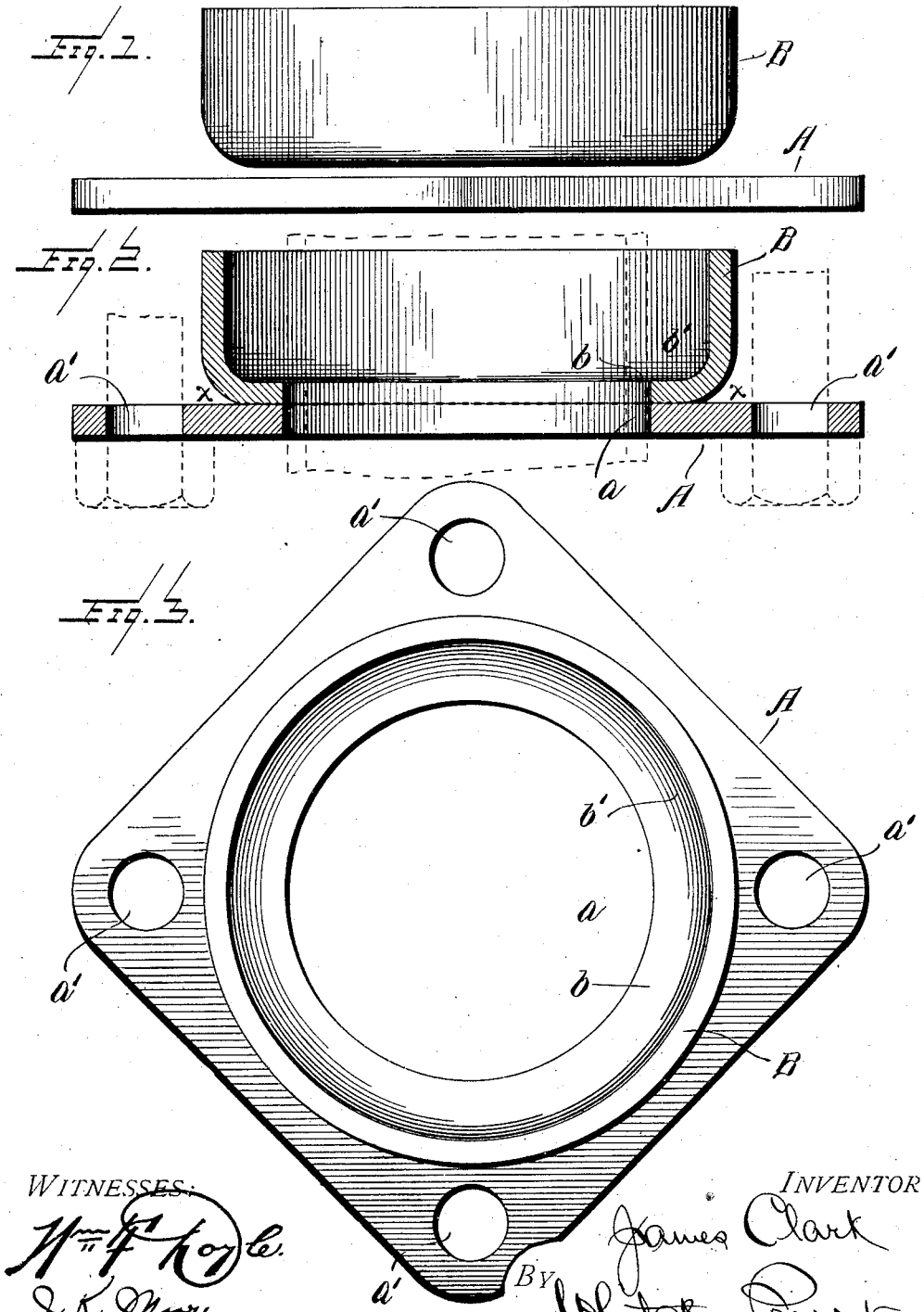
WITNESSES:
INVENTOR
James Clark
By
Attorney

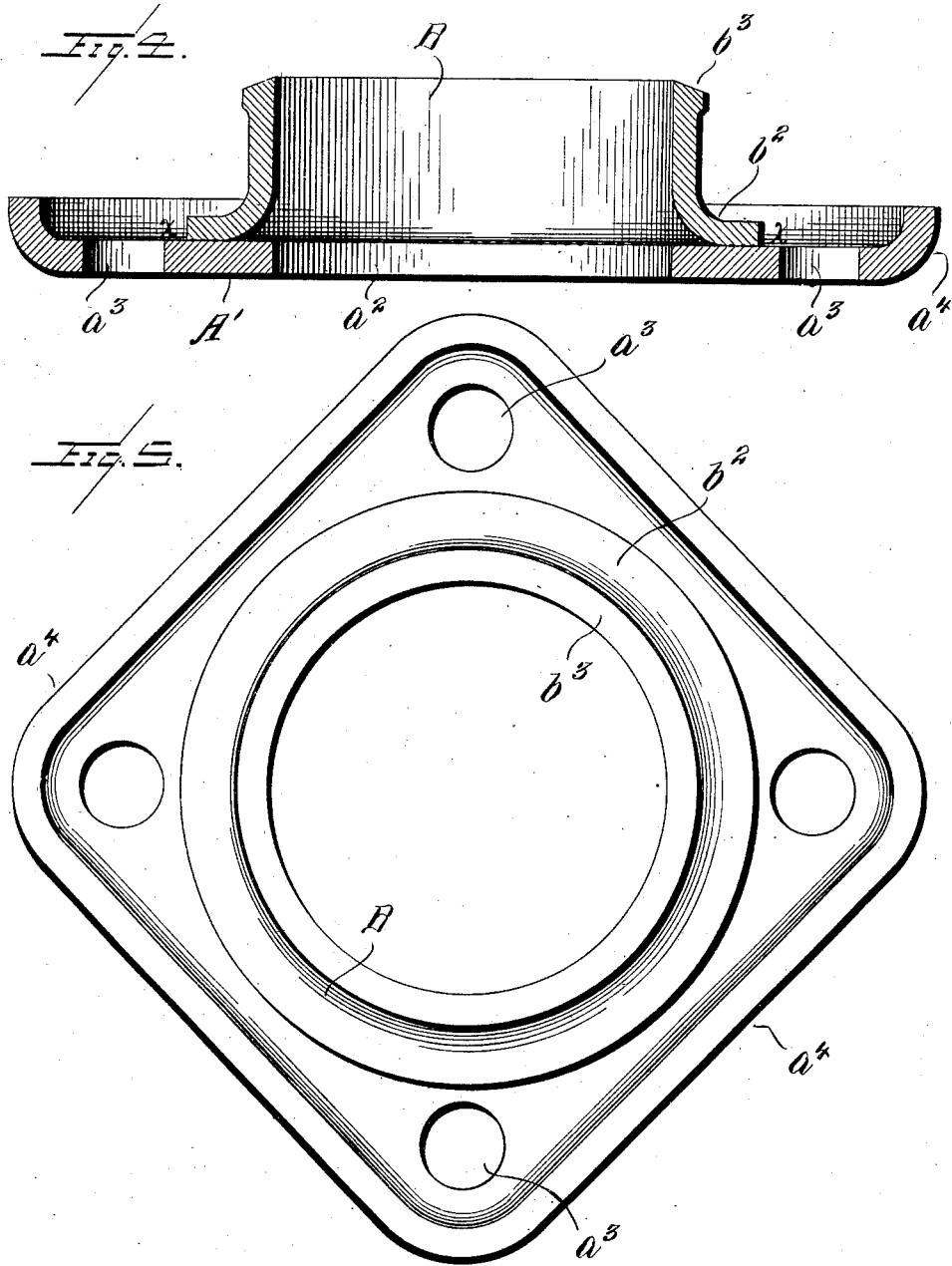

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

CLAMPING-RING.

No. 866,840.      Specification of Letters Patent.      Patented Sept. 24, 1907.

Application filed December 17, 1906. Serial No. 348,303.

*To all whom it may concern:*

Be it known that I, JAMES CLARK, a citizen of the United States, residing at Bradford, in the county of McKean and State of Pennsylvania, have invented certain new and useful Improvements in Clamping-Rings; and I do hereby declare the following to be a full, clear, and exact description of the invention, such as will enable others skilled in the art to which it appertains to make and use the same.

My invention consists of the novel features hereinafter described reference being had to the accompanying drawings which illustrate one form in which I have contemplated embodying my invention and a slight modification thereof, and said invention is fully disclosed in the following description and claims.

The object of my invention is to provide a clamping ring for pipe couplings which is formed of wrought metal preferably iron or steel (and which may be advantageously made of sheet metal), which will be cheap to manufacture and yet possess the required strength and durability. To this end I have contemplated forming the clamping ring in two separate pieces or parts, which may or may not be permanently united, said parts consisting of a plate member disposed perpendicularly to the axis of the pipe passing therethrough and provided with a central aperture for a pipe section, and bolt holes arranged at intervals around said aperture and a separate flange member having portions disposed substantially perpendicularly to the plate member, and having at the end adjacent thereto, portions bent perpendicularly to the axis of the ring and directly engaging one face of the plate member adjacent to the central aperture therein. the said flange being provided with packing engaging portions. The two parts of the clamping ring may if desired, be welded together, as hereinafter described or may be used without welding as preferred, and in either case the plate member and the flange members mutually reinforce each other as hereinafter more fully explained.

Referring to the accompanying drawings, Figure 1 is a side elevation of the two parts of my improved clamping ring showing them detached. Fig. 2 is a sectional view of the same showing the parts in operative relation. Fig. 3 is a plan view of the clamping ring. Fig. 4 is a sectional view of a modification of my invention. Fig. 5 is a plan view of the same.

In the drawings A represents the ring or plate member of my improved clamping ring disposed perpendicularly to the axis of the pipe section which it surrounds and which consists of a substantially flat plate, which is formed preferably of wrought metal, either wrought iron or steel, and which may be circular or polygonal, it being shown in Figs. 1, 2 and 3 as square with rounded corners. The plate or ring member A is provided with a central pipe aperture $a$, and with bolt holes $a'$ arranged at intervals around the said central aperture. In the form shown in these figures the bolt holes $a'$ are located adjacent to the four corners of the plate.

B represents what I term the flange member which is formed separately from the plate member, preferably of wrought metal, (as wrought iron or steel), and comprises an annular flange portion B, disposed substantially perpendicularly to the plane of the plate member, or in other words parallel to the axis of the clamping ring, or the pipe section with which it is used. The end of the flange B nearest the plate member is bent laterally either inwardly or outwardly so as to form what I term a reinforcing flange or portion disposed substantially perpendicularly to the axis of the clamping ring and therefore parallel to the adjacent face of the plate section and this reinforcing portion engages the plate section A around the pipe aperture $a$.

In the form shown in Figs. 1, 2 and 3 the flange member of the device has its inner end, or end adjacent to the plate member curved or bent inwardly, as at $b$ to form the reinforcing portion, the inner edge of which is circular and forms a pipe aperture which registers with the pipe aperture $a$ in the plate member. The reinforcing flange or portion $b$ engages a portion of the plate member surrounding the pipe aperture $a$, as shown in Fig. 2, so that when the bolts (indicated in dotted lines) are drawn up the plate member A is reinforced by the said annular reinforcing flange $b$, and vice versa reinforces the flange member. The flange member B is provided with a packing engaging portion, which receives or engages an annular packing, usually a packing ring (not shown) of rubber, or other suitable material. In the form shown in Figs. 1, 2 and 3 the inwardly curved flange portion $b$ forms within it a packing recess indicated at $b'$ to receive such a packing ring.

In Figs. 4 and 5 I have shown a slight modification of my invention in which A′ represents the plate member, here shown as circular in form, having a central pipe aperture $a^2$, bolt holes $a^3$ arranged around the central aperture, and having its outer edge turned or bent substantially perpendicularly to form a reinforcing flange $a^4$ and giving additional rigidity to the plate. The flange member B′ has its inner edge bent or curved outwardly to form a reinforcing flange $b^2$ which engages the plate member around the pipe aperture thereof, and the outer edge $b^3$ of said flange member is preferably thickened to form a packing engaging portion to engage a packing ring of rubber or other suitable material.

In both of the forms of the invention here shown and described the two members of the clamping ring are formed separately and may be so used. In some cases, however, the two separately formed members are permanently united before use, by welding or brazing or otherwise securing together the meeting or engaging portions of the reinforcing flange of the flange member and the adjacent face of the plate member.

The line on which the two members are welded or brazed or otherwise secured is indicated in Figs. 2 and 4 by the heavy dotted line x—x.

What I claim and desire to secure by Letters Patent is:—

1. A clamping ring for pipe couplings comprising a substantially flat plate member having a central pipe aperture and bolt holes and a separately formed flange member having an annular portion disposed substantially perpendicularly to the plate member, and having one end bent laterally to provide a reinforcing flange engaging portions of said plate member around the pipe aperture thereof and forming a central aperture registering with the pipe aperture of the plate member, substantially as described.

2. A clamping ring for pipe couplings composed of wrought metal, comprising a substantially flat plate member, having a central pipe aperture and bolt holes formed therein and a separately formed flange member having an annular portion disposed substantially perpendicularly to the plate member and having at one end inwardly curved portions forming a reinforcing flange substantially parallel to said plate member, and engaging portions of one face thereof around the said pipe aperture, said inwardly curved portions forming a pipe aperture registering with the pipe aperture in said plate member, substantially as described.

3. A clamping ring for pipe couplings composed of wrought metal, and comprising a plate member provided with a central pipe aperture and bolt holes and a separately formed flange member having an annular portion substantially perpendicular to the plate member and having portions at one end thereof bent into position parallel with said plate member to form a reinforcing flange, said plate member and said flange member being welded at the plane of contact between said plate member and said reinforcing flange, substantially as described.

In testimony whereof I affix my signature, in the presence of two witnesses.

JAMES CLARK.

Witnesses:
F. P. SCHOONMAKER,
LARNER G. ANDREWS.